US012668202B2

(12) United States Patent (10) Patent No.: US 12,668,202 B2

Pendergrass (45) Date of Patent: Jun. 30, 2026

(54) BEAM ASSEMBLY WITH MULTI-HOLLOW FORMATION

(71) Applicant: Shape Corp., Grand Haven, MI (US)

(72) Inventor: Ed Pendergrass, West Olive, MI (US)

(73) Assignee: Shape Corp., Grand Haven, MI (US)

( * ) Notice: Subject to any disclaimer, the term of this patent is extended or adjusted under 35 U.S.C. 154(b) by 371 days.

(21) Appl. No.: 18/064,768

(22) Filed: Dec. 12, 2022

(65) Prior Publication Data

US 2023/0116787 A1 Apr. 13, 2023

Related U.S. Application Data

(63) Continuation of application No. 17/249,152, filed on Feb. 22, 2021, now Pat. No. 11,524,645.

(Continued)

(51) Int. Cl.
B60R 19/18 (2006.01)
B21C 37/08 (2006.01)
B21D 53/88 (2006.01)

(52) U.S. Cl.
CPC .......... B60R 19/18 (2013.01); B21C 37/0803 (2013.01); B21D 53/88 (2013.01); B60R 2019/1806 (2013.01)

(58) Field of Classification Search
CPC . B60R 19/18; B60R 19/04; B60R 2019/1813; B60R 2019/1806; B60R 2019/182; B60R 2019/1826; B60J 5/0444; B21C 37/0803; E04C 3/04; E04C 2003/0404; E04C 2003/0408; E04C 2003/0413; E04C 2003/043; E04C 2003/0443
See application file for complete search history.

(56) References Cited

U.S. PATENT DOCUMENTS 4,099,759 A 7/1978 Kornhauser
4,766,953 A 8/1988 Grieb et al.
(Continued)

FOREIGN PATENT DOCUMENTS

CN 109318997 A 2/2019
CN 109963751 A 7/2019
(Continued)

OTHER PUBLICATIONS

International Search Report for application No. PCT/US2021/019070, mailed Apr. 15, 2021, 2 pp.
(Continued)

*Primary Examiner* — Kyle J. Walraed-Sullivan
(74) *Attorney, Agent, or Firm* — Bodman PLC

(57) ABSTRACT

A beam assembly includes a first beam that has a first tubular portion and a first projecting portion that extends from the first tubular portion. A second beam has a second tubular portion and a second projecting portion that extends from the second tubular portion. The elongated interior of the first tubular portion defines a first hollow area and the elongated interior of the second tubular portion defines a second hollow area. The first beam is attached to the second beam with the first projecting portion attached to the second tubular portion and the second projecting portion attached to the first tubular portion to define a third hollow area between the first and second projecting portions.

21 Claims, 5 Drawing Sheets

Related U.S. Application Data

(60) Provisional application No. 62/979,457, filed on Feb. 21, 2020.

(56) References Cited

U.S. PATENT DOCUMENTS

| | | | |
|---|---|---|---|
| 5,340,178 A | 8/1994 | Stewart et al. | |
| 6,003,912 A | 12/1999 | Schonhoff et al. | |
| 6,141,935 A * | 11/2000 | Artner | B60R 19/18 52/843 |
| 6,217,089 B1 | 4/2001 | Goto et al. | |
| 6,746,061 B1 | 6/2004 | Evans | |
| 7,197,824 B1 | 4/2007 | Graber | |
| 8,016,331 B2 | 9/2011 | Ralston et al. | |
| 9,764,704 B1 * | 9/2017 | Nusier | B60R 19/18 |
| 10,618,483 B2 * | 4/2020 | Newcomb | B29C 66/1122 |
| 12,134,425 B2 * | 11/2024 | Oxley | B62D 21/157 |
| 2003/0230129 A1 * | 12/2003 | Yoshida | B21D 9/08 72/166 |
| 2004/0130166 A1 | 7/2004 | Trancart et al. | |
| 2005/0082850 A1 * | 4/2005 | Reierson | B60R 19/18 293/102 |
| 2006/0082170 A1 * | 4/2006 | Reierson | B60R 19/18 293/102 |
| 2008/0093867 A1 | 4/2008 | Glasgow et al. | |
| 2008/0284183 A1 | 11/2008 | Johnson | |
| 2010/0127531 A1 | 5/2010 | Yasuhara et al. | |
| 2010/0201139 A1 * | 8/2010 | Hashimura | B60R 19/18 293/133 |
| 2012/0043772 A1 * | 2/2012 | Kinefuchi | B60R 19/03 293/102 |
| 2012/0074720 A1 | 3/2012 | Johnson et al. | |
| 2012/0228889 A1 * | 9/2012 | Haneda | B60R 19/18 293/132 |
| 2013/0241218 A1 * | 9/2013 | Tsuchida | B60R 19/18 293/133 |
| 2014/0138965 A1 * | 5/2014 | Kaneko | B60R 19/18 293/148 |
| 2014/0361558 A1 * | 12/2014 | Malkowski | B60R 19/18 29/897.2 |
| 2015/0097384 A1 * | 4/2015 | Conrod | B21B 15/0007 72/203 |
| 2015/0115572 A1 * | 4/2015 | Kim | B60R 19/12 293/146 |
| 2015/0115632 A1 * | 4/2015 | Iino | B60R 19/18 293/120 |
| 2016/0159300 A1 * | 6/2016 | Matecki | B60R 19/18 156/60 |
| 2016/0167609 A1 | 6/2016 | Corwin et al. | |
| 2016/0280163 A1 | 9/2016 | Matecki et al. | |
| 2017/0158151 A1 * | 6/2017 | Palisse | B60R 19/023 |
| 2017/0327153 A1 | 11/2017 | Kim et al. | |
| 2018/0029549 A1 * | 2/2018 | Palo | B21B 1/08 |
| 2018/0056352 A1 | 3/2018 | Weykamp et al. | |
| 2019/0366960 A1 * | 12/2019 | Brun | B60R 19/18 |
| 2020/0164820 A1 * | 5/2020 | Baas | B23K 26/34 |
| 2020/0262372 A1 * | 8/2020 | Herisson | B21D 53/88 |
| 2021/0024022 A1 * | 1/2021 | Matecki | B60R 19/03 |
| 2021/0261075 A1 * | 8/2021 | Pendergrass | B62D 25/025 |
| 2024/0075987 A1 * | 3/2024 | Matecki | B62D 21/02 |
| 2024/0217467 A1 * | 7/2024 | Lee | B60R 19/34 |
| 2024/0239284 A1 * | 7/2024 | Muskos | B60R 19/18 |
| 2024/0262424 A1 * | 8/2024 | Feuerstein | B62D 29/008 |
| 2024/0351091 A1 * | 10/2024 | Chao | B60R 19/18 |
| 2024/0399990 A1 * | 12/2024 | McHenry | B60R 19/34 |

FOREIGN PATENT DOCUMENTS

| | | | | |
|---|---|---|---|---|
| DE | 19525347 C1 | 7/1996 | | |
| DE | 102004048548 B3 | 12/2005 | | |
| DE | 102015101435 B3 * | 7/2016 | | |
| DE | 102019114895 A1 | 3/2020 | | |
| EP | 1378402 A1 * | 1/2004 | | B60R 19/18 |
| EP | 3528316 A1 | 8/2019 | | |
| GB | 1203303 A | 8/1970 | | |
| JP | S62233690 A | 10/1987 | | |
| JP | 2000335333 A | 12/2000 | | |
| JP | 2010125884 A | 6/2010 | | |
| JP | 2017149192 A | 8/2017 | | |
| JP | 2017535469 A | 11/2017 | | |
| JP | 2018501144 A | 1/2018 | | |
| JP | 2018131133 A | 8/2018 | | |
| WO | 2011055725 A1 | 5/2011 | | |
| WO | 2018184313 A1 | 10/2018 | | |

OTHER PUBLICATIONS

European Search Report for Application No. EP 21756513.4; mailed Mar. 28, 2024; 6 pp.

* cited by examiner

BEAM ASSEMBLY WITH MULTI-HOLLOW FORMATION

CROSS-REFERENCE TO RELATED APPLICATIONS

This application is a continuation of U.S. Non-provisional application Ser. No. 17/249,152, filed Feb. 22, 2021, which claims priority under 35 U.S.C § 119(e) to U.S. Provisional Patent Application No. 62/979,457, filed Feb. 21, 2020, the disclosures of which are considered part of this application and are hereby incorporated by reference in their entireties.

TECHNICAL FIELD

The present disclosure generally relates to a beam component, and more specificity relates to a tubular beam with at least one hollow interior, such as for use as a vehicle bumper reinforcement, a structural frame component, a battery tray component, or the like.

BACKGROUND

Vehicle beams used for reinforcement and structural support are typically designed for a specific vehicle application and mounting location on the vehicle. The cross-sectional shape of a beam used as a vehicle structural component is commonly designed to have a geometric shape that corresponds with desired packaging space, bending strength, and impact energy management characteristics for the application and location on the vehicle architecture. Further, a roll-formed beam that is designed for a specific component uses a customized set of roll tooling, such that alterations to a cross-sectional shape or design of a roll-formed beam often requires the costly investment in additional customized roll tooling.

SUMMARY

The present disclosure provides a beam assembly that incorporates multiple elongated beams into a single elongated beam assembly. The beam assembly may include beam sections that are cut from a single elongated beam and attached together in parallel alignment with each other to provide a more robust elongated beam structure with a desired cross-sectional shape, such as a cross-sectional shape with multiple hollow areas and/or multiple shear walls. Thus, at least some of the beam sections that are attached together to form the beam assembly may individually have the same cross-sectional shape. In doing so, desired cross-sectional attributes of the beam assembly may be achieved with reduced tooling that may otherwise be necessary to form a singular beam with similar cross-sectional attributes to the beam assembly.

According to one aspect of the present disclosure, a beam assembly includes a first beam that has a first tubular portion and a first projecting portion that extends from a first seam along the first tubular portion. A second beam has a second tubular portion and a second projecting portion that extends from a second seam along the second tubular portion. The elongated interior of the first tubular portion defines a first hollow area and the elongated interior of the second tubular portion defines a second hollow area. The first beam is attached to the second beam with the first projecting portion attached to the second tubular portion and the second projecting portion attached to the first tubular portion to define a third hollow area between the first and second projecting portions.

In some implementations, the first and second beams each have the same cross-sectional shape, such as a P-shaped cross-section that extends continuously along the length of the respective beam. Also, in some examples with the first beam disposed vertically above the second beam, the lower wall of the first beam and the upper wall of the second beam may be substantially planar and parallel to define internal shear walls of the beam assembly.

In further implementations, the beams may each be roll formed with a metal sheet that is made of high-strength steel, ultra-high-strength steel, or aluminum, among other metals. The first and second beams may be attached together via welding, such as with continuous welding along the length of the first and second beams.

In other aspects, the beam assembly may include a third beam that has a third tubular portion and a third projecting portion extending from a third seam along the third tubular portion. The third beam may have the same cross-sectional shape as the first and second beams. In some examples, the third beam may be attached to the second beam with the third projecting portion disposed perpendicular to the first and second projecting portions, such as to form a floor support for a vehicle battery tray.

Optionally, the beam assembly may be installed as a frame component of a vehicle, such as a rocker beam, a rocker insert, a floor cross member, a roof cross member, a pillar structure, or other structural vehicle component. In some implementations, the beam assembly may be used as a bumper reinforcement beam, a door beam, or as part of another impact energy management structure. Further, in some examples, the beam assembly may be used as a battery tray component, such as a tray frame wall or cross member.

According to another aspect of the present disclosure, a beam assembly includes a first beam that has a first tubular portion and a first projecting portion extending along the first tubular portion. The beam assembly also comprises a second beam that includes a second tubular portion and a second projecting portion extending along the second tubular portion. The first and second beams are formed from a metal sheet, such that the first and second tubular portions each having a seam disposed along a length thereof that is defined by an edge section of the metal sheet attached along an intermediate section of the metal sheet. The first and second projecting portions integrally protrude at the seam from the intermediate section of the metal sheet. The first beam is attached to the second beam with the first projecting portion attached to the second tubular portion and the second projecting portion attached to the first tubular portion to define a hollow area between the first and second projecting portions.

These and other objects, advantages, purposes, and features of the present disclosure will become apparent upon review of the following specification in conjunction with the drawings.

DETAILED DESCRIPTION

Figure 1:
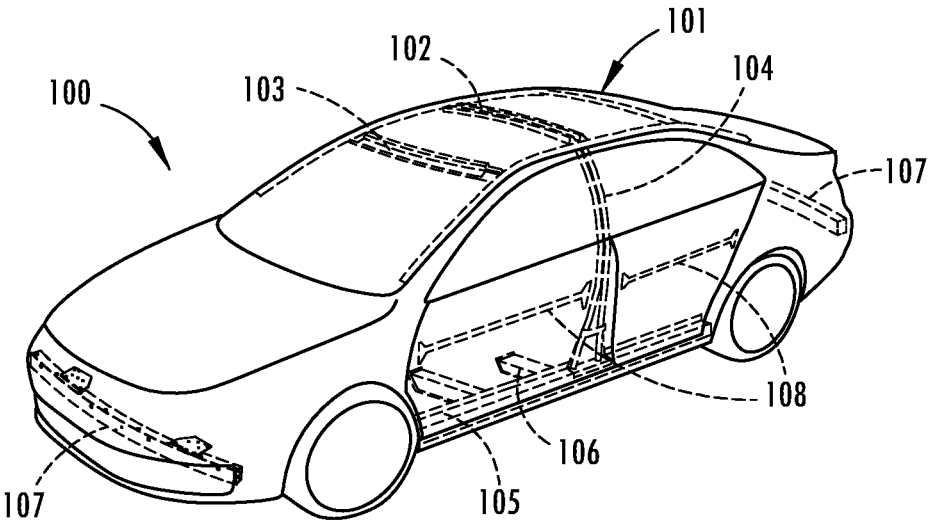
FIG. 1 is an upper perspective view of a vehicle schematically illustrating various examples of beam assemblies.
Figure 2:
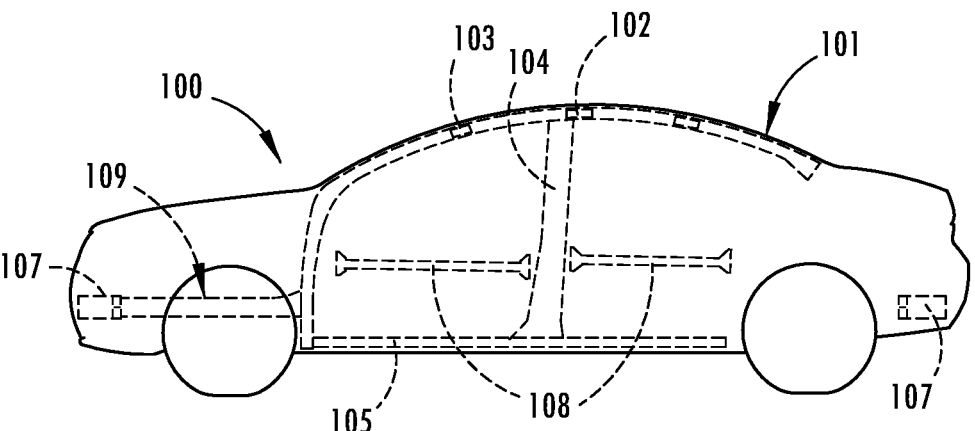
FIG. 2 is a side elevation view of the vehicle shown in FIG. 1 schematically illustrating additional examples of beam assemblies.
Figure 3:
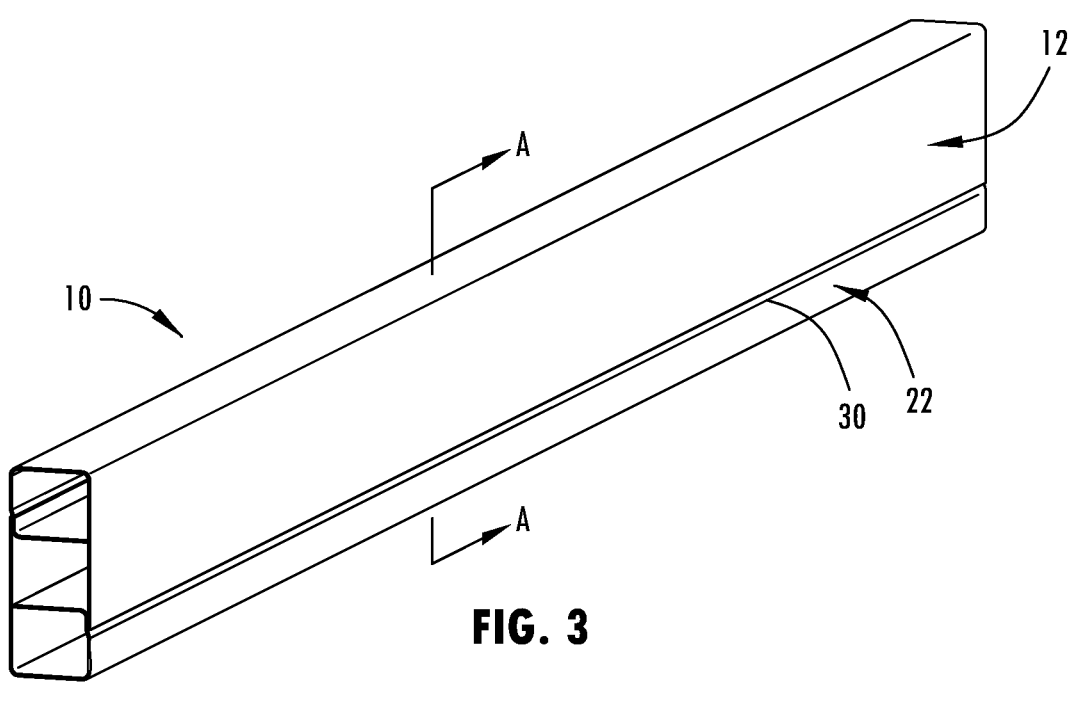
FIG. 3 is an upper perspective view of an example beam assembly.
Figure 3A:
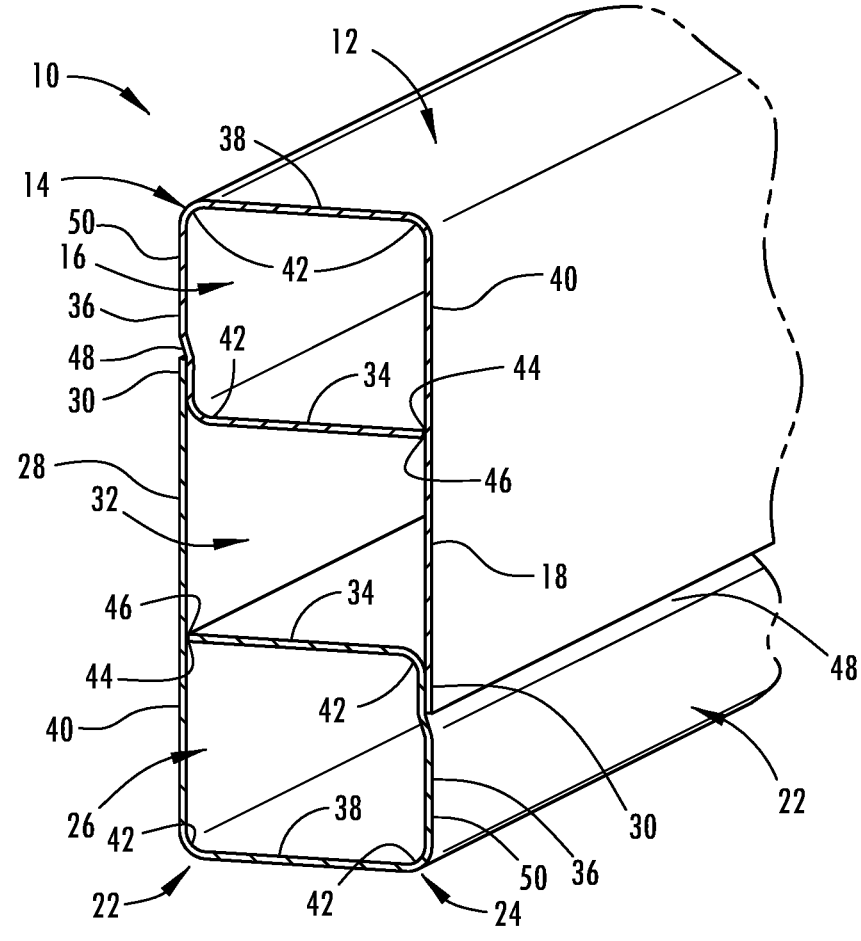
FIG. 3A is a cross-sectional perspective view of the beam assembly shown in FIG. 3, taken at line A-A.
Figure 4:
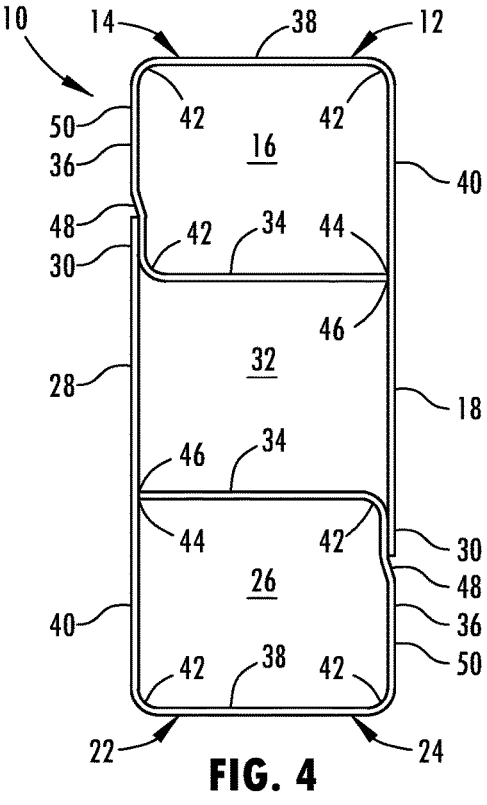
FIG. 4 is an end view of the beam assembly shown in FIG. 3.

Referring now to the drawings and the illustrative embodiments depicted therein, a beam assembly is provided that may be used in various beam applications, such as in components or structures of automotive vehicles, including electric vehicles (EVs) and internal combustion engine (ICE) vehicles, such as the vehicle 100 shown in FIGS. 1 and 2. The beam assembly, such as those shown in FIGS. 3-7 and 9-12, incorporates multiple elongated beams into a single elongated beam assembly. As shown in FIGS. 3-4, the beam assembly 10 includes a first beam 12 that has a tubular portion 14 with an elongated hollow interior 16 and a projecting portion 18 that protrudes outward from a seam that extends along the tubular portion 14. A second beam 22 also has a tubular portion 24 with an elongated hollow interior 26 and a projecting portion 28 that protrudes outward from a seam that extends along the tubular portion 24. Thus, the first and second beams 12, 22 may each have the same cross-sectional shape, such as a P-shaped cross-section. With generally the same cross-sectional shape, the first and second beams 12, 22 may, prior to assembly, be cut from a single elongated beam, such as a continuous roll formed beam. The first and second beams 12, 22 are attached together in parallel alignment and alongside each other to combine in forming a desired cross-sectional shape of the overall beam assembly 10.

To form the beam assembly 10, the first and second beams 12, 22 may be disposed in a flipped, mirrored relationship across a longitudinal plane that extends axially between the tubular portions 14, 24 of the first and second beams 12, 22. In other words, when starting with the first and second beams 12, 22 in the same orientation, one of the beams is rotated axially along its longitudinal axis approximately 180 degrees relative to the other beam prior to attaching the beams 12, 22 together. As shown for example in FIGS. 3-4, the first beam 12 is attached to the second beam 22 with the projecting portion 18 of the first beam 12 attached to the tubular portion 24 of the second beam 22 and the projecting portion 28 of the second beam 22 attached to the tubular portion 14 of the first beam 12 to define at least two separate attachment points 30 or seams disposed between the beams 12, 22 longitudinally along the length of the beam assembly 10. The attachment points 30 may be formed with welding, such as with continuous welded seams or intermittent spot welds, or may be formed with other types of attachment, such as adhesive or fasteners or the like.

As shown in FIGS. 3-4, the opposing walls 34 of the tubular portions 14, 24 of the first and second beams 12, 22 that face each other may be spaced away from each other to define an elongated hollow area 32 between the beams 12, 22. The hollow area 32 is also bounded between the projecting portions 18, 28 of the beams 12, 22. With the spacing that provides the defined central hollow area 32 of the beam assembly 10, the opposing walls 34 of the tubular portions 14, 24 may function to reinforce the overall interior area of the beam assembly 10, such as by acting as internal shear walls of the beam assembly 10. Further, the opposing walls 34 of the beam assembly 10 divide the interior area to provide a multi-hollow shape that is defined by the hollow interiors 16, 26 of the tubular portions 14, 24 of the respective beams 12, 22 and the central or third hollow area 32 that is disposed between the tubular portions 14, 24. It is contemplated that additional examples of the beam assembly may have various alternative cross-sectional shapes and configurations, such as with additional or alternative beams, attachment points or hollow areas to provide the desired cross-sectional shape of the beam assembly.

The perimeter cross-sectional shape of the beam assembly 10 may be a rectangular shape, such as also shown in FIGS. 3-4. In addition, the tubular portions 14, 24 may each have a generally rectangular cross-sectional shape that is defined by four orthogonally arranged wall sections. For example, as shown in FIG. 4, the beams 12, 22 may be roll formed from a metal sheet to form the tubular portions 14, 24 with a first wall section 34, a second wall section 36, a third wall section 38, and a fourth wall section 40 that together comprise a rectangular cross-sectional shape. The tubular portions 14, 24 have three rounded corners 42 that are defined by the bend radius of the metal sheet, which can be limited by the material thickness and material ductility, such as greater than approximately four times the thickness of the metal sheet. The beams may each be roll formed with a metal sheet that is made of high-strength steel, ultra-high-strength steel, or aluminum, among other metals.

As shown in FIG. 4, the remaining square corner 44 of the tubular portion 14, 24 is formed by an edge 46 of the first wall section 34 being attached to an intermediate location on the metal sheet between the fourth wall section 40 and the projecting portion 18, 28. The seam formed at the edge 46 of the metal sheet may be attached by welding the edge 46 against the metal sheet, such as with the formation of a fillet weld or the like. Such welding may be done, for example, by intermittent spot welding or continuous welding along the beam. The attachment location of the first wall section 34 at the sheet forms a seam and generally separates the fourth wall section 40 and the projecting portion 18, 28. As shown in FIG. 4, the projecting portions 18, 28 extend from the tubular portions 14, 24 in planar alignment with the respective fourth wall section 40. When the two separate beams 12, 22 are attached together, the third hollow area 32 formed between the beams is surrounded by the projecting portions 18, 28 and the fourth wall sections 40 of the tubular portions 14, 24.

With further reference to FIGS. 3-4, the tubular portions 14, 24 may each include a recessed area 48 to receive the edge of the projecting portion 18, 28 of the other beam. The recessed area 48, shown in FIG. 4, is disposed at the second wall section 36 and has a depth protruding inward into the respective hollow interior area 16, 26 a distance generally equal to the thickness of the engaged edge of the projecting portion 18, 28. The approximate depth of each recessed area 48 shown in FIG. 4 is measured between the planar outer surface of the second wall section 36 and the planar outer surface at the recessed area 48, which is generally equal to the thickness of the metal sheet of the other beam. The recessed area 48 generally aligns the planar outer surface of the second wall section 36 with the outer surface of the attached projecting portion 18, 28, which may also be aligned with the outer surface of the fourth wall section 40 from which the respective projecting portion 18, 28 extends. The aligned projecting portions 18, 28, second wall sections 36, and fourth walls sections 40 together form parallel and opposing outer walls of the overall beam assembly 10.

Figure 5:
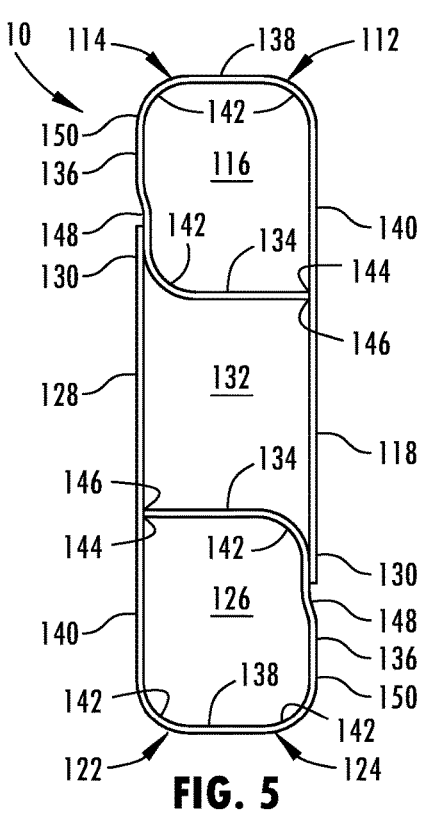
FIGS. 5-7 are end views of additional examples of a beam assembly.

Referring now to FIGS. 5-10, additional examples of a beam assembly 110 (FIG. 5), 210 (FIG. 6), 310 (FIG. 7), 410 (FIG. 8), 510 (FIG. 9), 610 (FIG. 10) are shown that illustrate alternative cross-sectional shapes from that illustrated in FIGS. 3-4. For example, in the orientation shown in FIG. 5, the beam assembly 110 has a reduced horizontal width from the beam assembly 10 shown in FIG. 4. The reduced width of the beam assembly 110 is provided by the tubular portions 114, 124 of each beam 112, 122 having a reduced width, and more specifically, the first and third wall sections 134, 138 having a shorter length. The beam assembly 110 shown in FIG. 5 may be formed with generally the same length of the second and fourth wall sections 136, 140, same length of the projecting portion 118, 128, and same number of bends as the beam assembly 10 shown in FIG. 4. However, the radius of curvature at the corner bends 142 is larger in FIG. 5 than the corner bends 42 in FIG. 4 and the overall width of the metal sheet used to form each beam 112, 122 the beam assembly 110 in FIG. 5 is less than the width of the metal sheet used to form the beams 12, 22 in FIG. 4.

Figure 6:
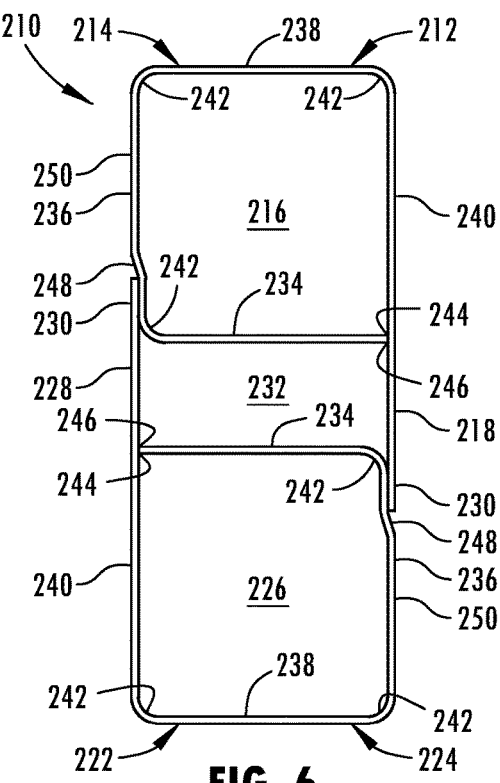

Moreover, as shown in the orientation in FIG. 6, the beam assembly 210 has the same rectangular perimeter cross-sectional shape as the beam assembly 10 shown in FIG. 4, but has internal sheer walls located closer together. The closer shear walls are provided by the tubular portions 214, 224 of each beam 212, 222 having an increased height, and more specifically, the second and fourth wall sections 236, 240 having a longer length. To maintain the same overall height of the beam assemblies 10, 210 in FIGS. 4 and 6, the projecting portions 218, 228 of the beam assembly 210 in FIG. 6 are reduced in length by the same general length that the tubular sections are increased in height. Thus, the dimensional alterations shown in FIG. 6 may be formed with the same metal sheet, bend configurations, and roll tooling, but altering the positions of the roll tooling on the roll forming line. Thus, the beam assembly in different examples may include various dimensional variations.

Figure 7:
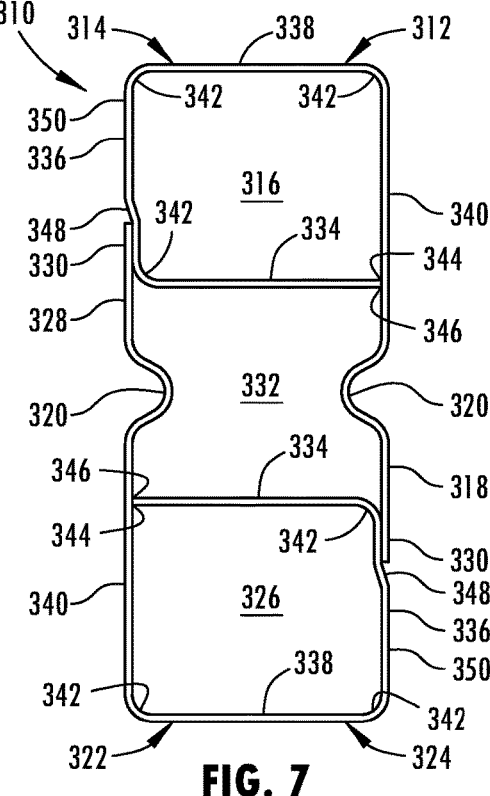

The beam assembly may also include one or more channel ribs to stiffen a portion of the beam assembly. As shown for example in FIG. 7, the projecting portions 318, 328 of the beam assembly 310 each include a channel rib 320 at a central section thereof and extending along a length of the respective beam 312 322. By locating the channel ribs 320 on the projecting portions 318, 328, the channel ribs 320 are disposed at a central vertical location of the beam assembly 310 and protrude into opposing sides of the central or third hollow area 332. The beam assembly 310 shown in FIG. 7 is otherwise similar to the beam assembly 10 shown in FIG. 4, such that the channel rib alterations may be made by increasing the width of the metal sheet and adding roll tooling that forms a channel rib 320 in the projecting portion. In further examples, it is contemplated that additional channel ribs may be provided on other portions of a beam assembly, such as at wall sections of the tubular portions.

Figures 8, 9, 10:
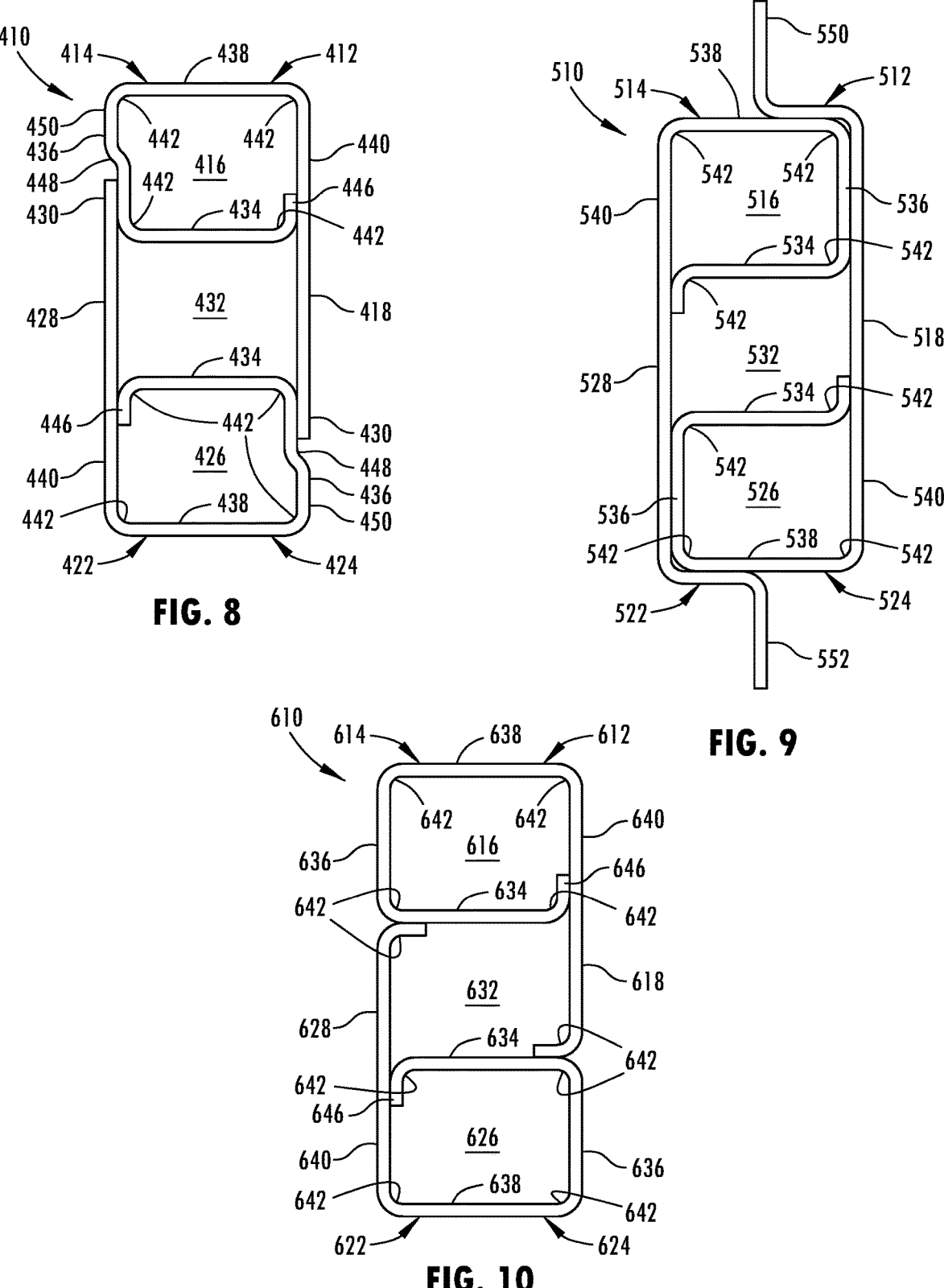
FIG. 8 is a side elevation view of a vehicle schematically illustrating an additional example of a beam assembly of a battery tray structure.
FIG. 9 is a cross-sectional view of a side wall portion the battery tray structure shown in FIG. 8.
FIGS. 10-12 are end views of additional examples of a beam assembly.

As further shown in FIG. 8, the beam assembly 410 has the same general cross-sectional shape as the beam assembly 10 shown in FIG. 4, except for the attachment of the edge portion 446 of the first wall section 434 to the metal sheet. As shown in FIG. 8, the seam formed at the edge portion 446 of the metal sheet may include a corner bend 442, so that the a planar side surface of the metal sheet at the edge portion 446 attaches to the planar side surface of the metal sheet between the fourth wall section 440 and the projecting portion 418, 420. This flat surface attachment may be provided by welding, for example, by intermittent spot welding or continuous welding along the beam. For instance, a laser weld may be formed by orienting the laser head generally perpendicular to the exterior surface of the metal sheet, such that the laser weld may be formed perpendicularly through the portion of the metal sheet that overlaps the edge portion 446. As shown in FIG. 8, the edge portions 446 are bent to extend into the hollow interior areas 416, 426 of the respective beams 412, 422. As shown in FIG. 8, the projecting portions 418, 428 extend from the tubular portions 414, 424 in planar alignment with the edge portions 446 and the respective fourth wall section 440.

Similarly, as shown in FIG. 10, the beam assembly 610 has the same general cross-sectional shape and edge portion attachment as the beam assembly 410 shown in FIG. 8, except for the attachment of the projecting portions 618, 628 to the tubular portions 614, 624 of the other respective beam. As shown in FIG. 10, the edges of the projecting portions 618, 628 may also include a corner bend 642, so that the a planar side surface of the metal sheet at the projecting portion 618, 628 attaches to the planar side surface of the first wall section 634. This flat surface attachment may be provided by welding, for example, by intermittent spot welding or continuous welding along the beam. For instance, a laser weld may be formed along the crevice seam by orienting the laser head generally perpendicular to the exterior surface of the second wall section 636 and the projecting portions 618, 628. Also, as shown in FIG. 10, the edges of the projecting portions 618, 628 are bent to extend into the central interior areas 632. In doing so, the recessed area may be omitted from the second wall section.

Furthermore, as shown in FIG. 9, the projecting portions 518, 528 attach at the tubular portions 514, 524 and extend beyond the tubular portion to provide a flange 550, 552 for attaching to an adjacent vehicle component. For example, the flanges 550, 552 may be used to attach the beam assembly 510 between inner and outer rocker sills or may be used in place of either or both rocker sill components. The flanges may be alternatively shaped or located in different examples to provide a design that accommodates the corresponding vehicle design. As shown in FIG. 9, the projecting portions 518, 528 are disposed over the over second wall sections 536 and each have a bend that corresponds with the corner bend 542 between the second wall section 536 and the third wall section 538, such that the projecting portions 518, 528 follow along and over the third wall sections 538. As further shown in FIG. 9, the projecting portions have an outward directing bend that directs the flanges 550, 552 orthogonally outward from the third wall section 538.

Figure 11:
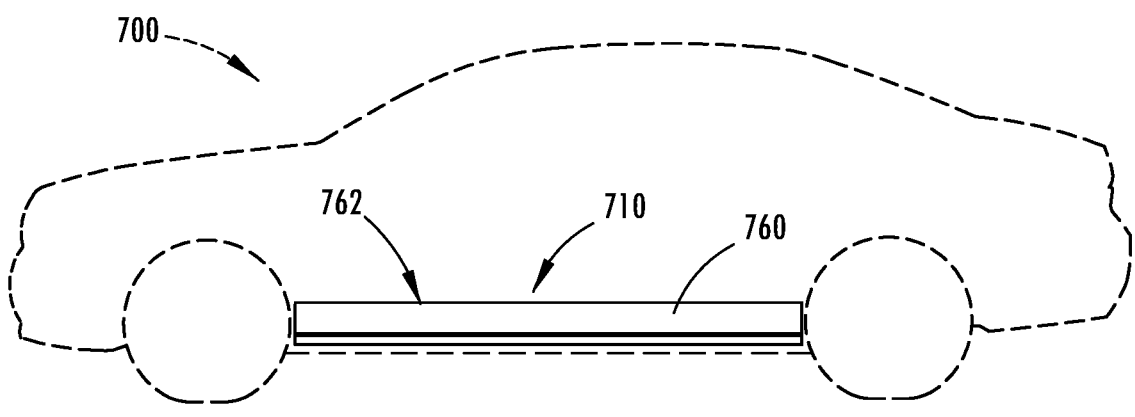
Figure 12:
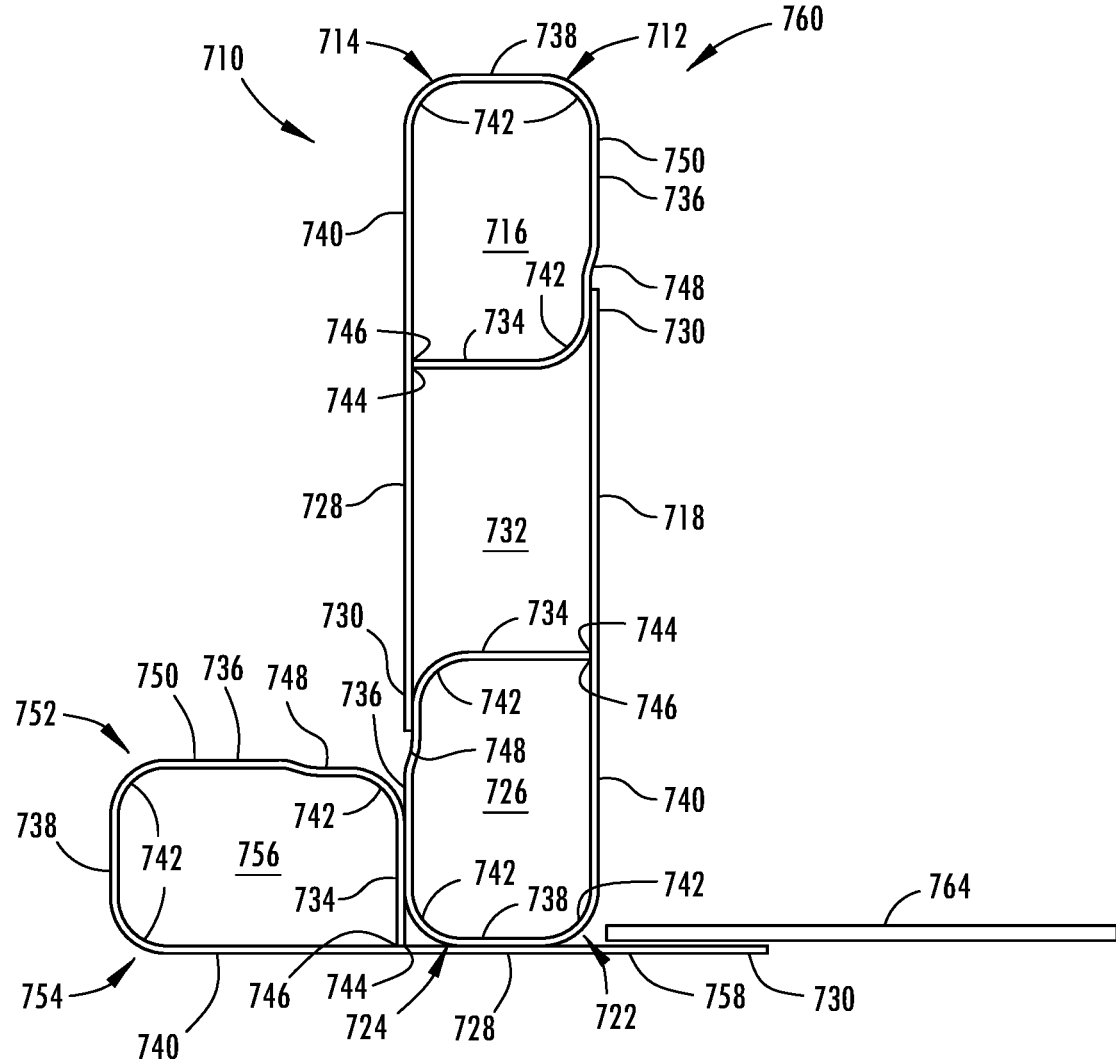

Referring now to FIGS. 11 and 12, the beam assembly 710 includes a third beam 752 that has a tubular portion 754 with an elongated hollow interior 756 and a projecting portion 758 that extends from the tubular portion 754. As shown in FIG. 12, the third beam 752 has the same cross-sectional shape as the first and second beams 712, 722, shown as a P-shaped cross-section. As such, the three beams 712, 722, 752 may be cut from a single elongated beam, such as a continuous roll formed beam. The beams 712, 722, 752 are attached together in parallel alignment and alongside each other to combine in forming a desired cross-sectional shape of the beam assembly 710, which has four hollow interior areas.

As further shown in FIGS. 11 and 12, the third beam 752 is attached to the second beam 722 with the projecting portion 758 of the third beam 752 arranged perpendicular to the other projecting portions 718, 728 and is attached to a lower wall section 738 of the lower tubular portion. The first wall section 734 of the tubular portion 754 of the third beam 752 is also attached to the lower tubular portion at the second wall section 736. With such a cross-sectional shape, the beam assembly 710 shown in FIG. 12 can be used as a side wall 760 of a battery tray 762, such as shown in FIG. 11. The tubular portion 754 of the third beam 752 may be arranged on an outboard side of the side wall 760 to aid with side impact energy absorption. Also, the projecting portion 758 of the third beam 752 may be arranged on an inboard side of the side wall 760 to form a floor support for a floor 764 of the battery tray 762, as well as any additional interior component of the battery tray 762.

With respect to the various vehicle applications, the beam assembly may be used, for example, as a vehicle bumper reinforcement, a structural frame component, a battery tray component. As shown for example in FIGS. 1 and 2, these include, for example, roof bows 102, headers 103, pillars 104, rockers 105, floor cross members 106, bumper beams 107, door beams 108, frame rail tips 109, and the like. As shown in FIGS. 1 and 2, the beam assembly may be designed to undergo various impact forces, such as for vehicle bumper reinforcement beams 107 and door beams 108 and the like. As further provided in the exemplary vehicle 100 shown FIGS. 1 and 2, a body structure or frame 101 of the vehicle 100 has multiple structural beam components, one or all of which may be provided as a beam assembly as described herein. For example, the beam assembly may be designed to support and sustain different loading conditions, such as for supporting horizontal spans, like a roof bow 102 and a rocker rail 105 or insert thereof, or for supporting axial loads, like the pillars 104 of the vehicle frame. Furthermore, as shown on the vehicle 700 in FIG. 11, the beam assembly may be used as a structural component of a battery tray 762, such as a perimeter side wall 760 or cross-member beam that spans between opposing side walls of the battery tray.

The cross-sectional shape of the beam assembly may include various shapes and thicknesses for the desired application of the beam assembly, such as an open profile or a closed profile, which may include a multi-tubular profile that has two or more hollow interior areas that extend longitudinally within the pultruded profile.

For purposes of this disclosure, the terms "upper," "lower," "right," "left," "rear," "front," "vertical," "horizontal," and derivatives thereof shall relate to the appliance as oriented in FIG. 1. However, it is to be understood that the appliance may assume various alternative orientations, except where expressly specified to the contrary. It is also to be understood that the specific devices and processes illustrated in the attached drawings and described in this specification are simply exemplary embodiments or implementations. Accordingly, the terminology that has been used is intended to be in the nature of words of description rather than of limitation. Hence, specific dimensions and other physical characteristics relating to the embodiments or implementations disclosed herein are not to be considered as limiting, unless the claims expressly state otherwise. Many modifications and variations of the embodiments and implementations are possible in light of the above teachings.

What is claimed is:

1. A beam assembly comprising:
a first beam comprising a first metal sheet, the first metal sheet forming an enclosed portion and a remaining portion of the first metal sheet extending along the enclosed portion of the first beam; and a second beam having a second metal sheet, the second metal sheet forming an enclosed portion, wherein the first beam is attached to the second beam with the remaining portion of the first metal sheet attached to the enclosed portion of the second beam to define a hollow area between the first and second beams,
wherein the remaining portion of the first metal sheet is disposed over a wall section of the enclosed portion of the second beam and includes a distal end that extends away from the enclosed portion of the second beam at an inset location from the wall section to provide a flange.

2. The beam assembly of claim 1, wherein the second beam comprises a projecting portion extending along the enclosed portion of the second beam.

3. The beam assembly of claim 2, wherein the projecting portion of the second beam is attached to the enclosed portion of the first beam.

4. The beam assembly of claim 1, wherein the wall section of the enclosed portion of the first beam comprises a planar section.

5. The beam assembly of claim 1, wherein the first beam and the second beam each comprise a same cross-sectional shape.

6. The beam assembly of claim 1, wherein the first beam comprises a P-shaped transverse cross section.

7. The beam assembly of claim 6, wherein the P-shaped transverse cross section extends continuously along a length of the first beam.

8. The beam assembly of claim 1, wherein the first and second beams are attached together via welding.

9. The beam assembly of claim 1, wherein the enclosed portion of the first beam comprises at least three substantially planar wall sections, and wherein the remaining portion of the first metal sheet extends from the enclosed portion of the first beam in planar parallel alignment with one of the wall sections.

10. The beam assembly of claim 1, wherein the enclosed portion of the first beam has a seam disposed along a length of the first beam, the seam defined by an edge section of the first metal sheet attached along an intermediate section of the first metal sheet, and wherein the remaining portion of the first metal sheet protrudes at the seam from the intermediate section of the first metal sheet.

11. A beam assembly comprising:
a first beam comprising a first metal sheet that forms a first enclosed portion and a first projecting portion extending along the first enclosed portion; and
a second beam comprising a second metal sheet that forms a second enclosed portion and a second projecting portion extending along the second tubular portion,
wherein the first beam is attached to the second beam with the first projecting portion attached to the second enclosed portion and the second projecting portion attached to the first enclosed portion to define a hollow area surrounded by the first and second enclosed portions and the first and second projecting portions, and
wherein the first projecting portion of the first beam is partially disposed over and partially extends away from the second enclosed portion of the second beam to provide a first flange inset from an outer wall section of the second enclosed portion.

12. The beam assembly of claim 11, wherein a cross-sectional shape of each of the first beam and the second beam taken transverse to lengths of the first and second beams comprises a P-shape.

13. The beam assembly of claim 11, wherein a cross-sectional shape of the first beam and the second beam taken transverse to lengths of the first and second beams extend continuously along the respective lengths.

14. The beam assembly of claim 11, wherein the first and second beams are attached together via welding.

15. The beam assembly of claim 11, wherein the second projecting portion of the second beam is disposed over and extends beyond the first enclosed portion of the first beam to provide a second flange.

16. The beam assembly of claim 11, wherein the first enclosed portion comprises at least three substantially planar wall sections, and wherein the first projecting portion of the first metal sheet extends from the first enclosed portion in parallel alignment with one of the at least three substantially planar wall sections.

17. The beam assembly of claim 11, wherein the first flange is disposed in a first plane, the first projecting portion is disposed in a second plane, and the first plane is parallel to the second plane.

18. The beam assembly of claim 11, wherein the first enclosed portion has a seam disposed along a length of the first enclosed portion, the seam defined by an edge section of the first metal sheet attached along an intermediate section of the first metal sheet, and wherein the first projecting portion of the first metal sheet protrudes at the seam from the intermediate section of the first metal sheet.

19. A beam assembly comprising:

a first beam comprising a first metal sheet, the first metal sheet forming a first enclosed portion and a first projecting portion extending along the first enclosed portion; and a second beam having a second metal sheet, the second metal sheet forming a second enclosed portion and a second projecting portion extending along the second enclosed portion, wherein the first beam is attached to the second beam with the first projecting portion of the first beam attached to the second enclosed portion of the second beam and the second projecting portion of the second beam attached to the first enclosed portion of the first beam to define a hollow area between the first and second beams, wherein the first projecting portion of the first beam is partially disposed over and partially extends away from the second enclosed portion of the second beam at an inset location between opposing outer walls of the second enclosed portion to provide a first flange.

20. The beam assembly of claim 19, wherein the first enclosed portion has a first seam disposed along a length of the first enclosed portion, the first seam defined by an edge section of the first metal sheet attached along an intermediate section of the first metal sheet, wherein the second enclosed portion has a second seam disposed along a length of the second enclosed portion, the second seam defined by an edge section of the second metal sheet attached along an intermediate section of the second metal sheet, and wherein the second projecting portion of the second beam is disposed over and extends beyond the first enclosed portion of the first beam to provide a second flange.

21. The beam assembly of claim 19, wherein the first flange is disposed in a first plane, the first projecting portion is disposed in a second plane, and wherein the first plane is parallel to the second plane.

* * * * *